United States Patent [19]

Reiniger

[11] 4,111,744

[45] Sep. 5, 1978

[54] PROCESS FOR PRODUCING FUSED CELLULOSE PRODUCTS

[76] Inventor: Haigh M. Reiniger, Contentment Island, Darien, Conn. 06820

[21] Appl. No.: 687,874

[22] Filed: May 19, 1976

Related U.S. Application Data

[60] Continuation of Ser. No. 451,366, Mar. 14, 1974, abandoned, which is a continuation-in-part of Ser. No. 293,559, Sep. 30, 1972, abandoned, which is a division of Ser. No. 76,759, Sep. 30, 1970, abandoned.

[51] Int. Cl.$^2$ ............................................. H05B 1/00
[52] U.S. Cl. ..................... 162/100; 264/25; 264/85; 264/120; 264/123; 264/126; 162/181 R
[58] Field of Search ................. 264/109, 25, 120, 123, 264/124, 126, 85; 162/100, 181

[56] References Cited

U.S. PATENT DOCUMENTS

| | | | |
|---|---|---|---|
| 2,581,652 | 1/1952 | Goss | 264/124 |
| 3,444,275 | 5/1969 | Willett | 264/102 |

FOREIGN PATENT DOCUMENTS 532,991  11/1956  Canada ..................... 264/124

*Primary Examiner*—Robert F. White
*Assistant Examiner*—James R. Hall
*Attorney, Agent, or Firm*—Parmelee, Johnson, Bollinger & Bramblett

[57] ABSTRACT

Cellulose-containing materials such as wood fiber or vegetable fibers are permanently fused in a fast-acting process by subjecting the fibers to conditions producing a new state of fusion and chemical combining under intensive heating while excluding oxygen, and requiring little or no primary binder additives. This fused cellulose is reached by introducing cellulose materials having equilibrium moisture content from 2% to 50% (preferably 3% to 12%) into an oxygen-excluding reaction station having temperature in the range from 450° F to 800° F and wherein dielectric energy is applied in conjunction with high ambient temperature. The temperature is well beyond the normal cellulose carbonizing temperature and cellulose combustibility at temperatures of about 400° F. Specific exposure of the materials to elevated temperature is accurately controlled to minimize possible carbonizing. As quickly as possible, the fused material is transferred to an oxygen-excluding hot stacking station where a continuation of the initial fusion reaction is carried out. Thin perforated metal sheets with associated back-up members allow internally generated steam and gases to escape from each cellulose-containing mat and expel entrained air. Novel fused cellulosic products including boards, panels and paper are enabled to be produced, including products having exterior grade weathering strength in spite of the fact that no primary binder additives are used in their formation. Commercially smooth two sides board products are produced without the need for wasteful and expensive machine sanding operations.

14 Claims, 12 Drawing Figures

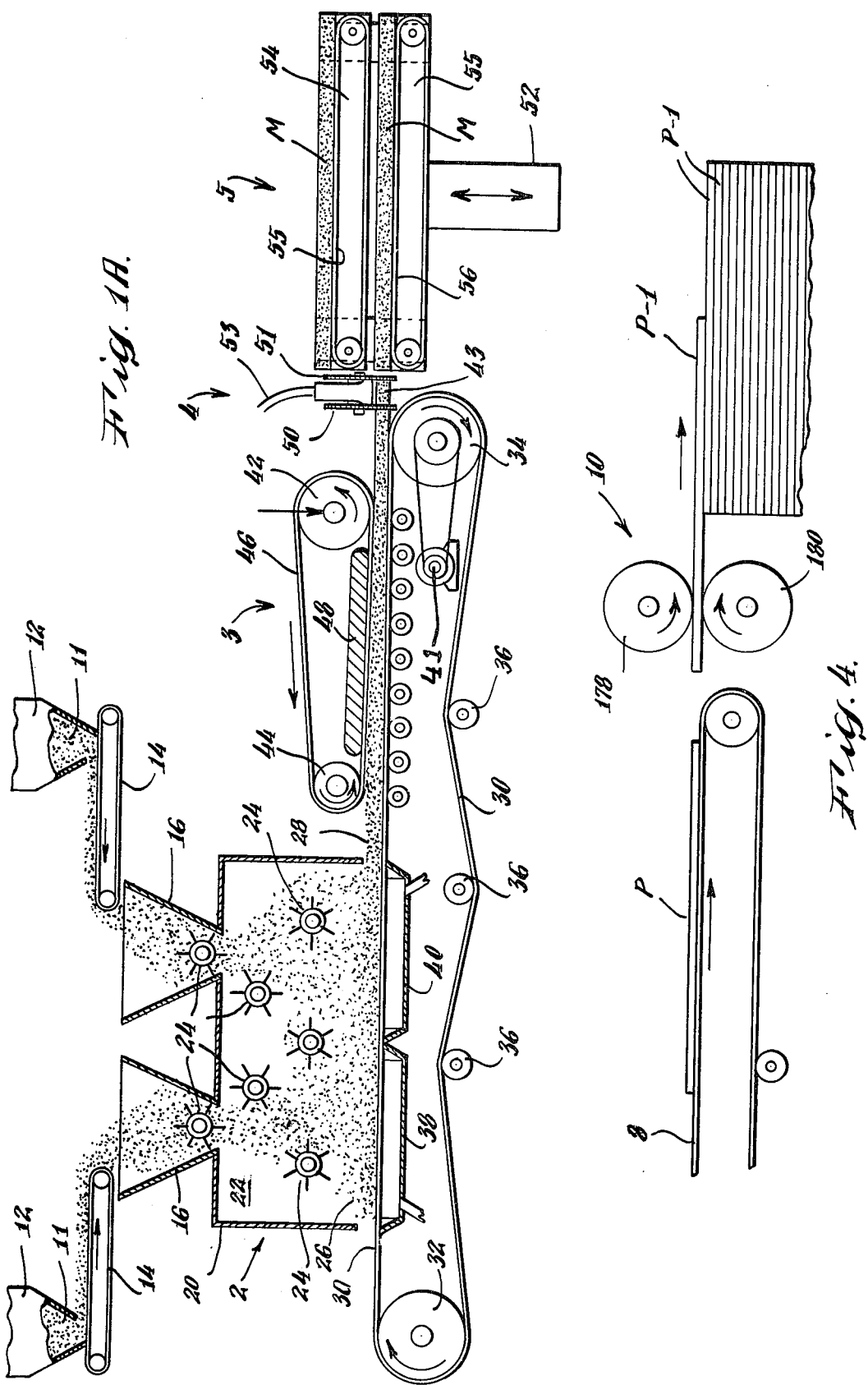

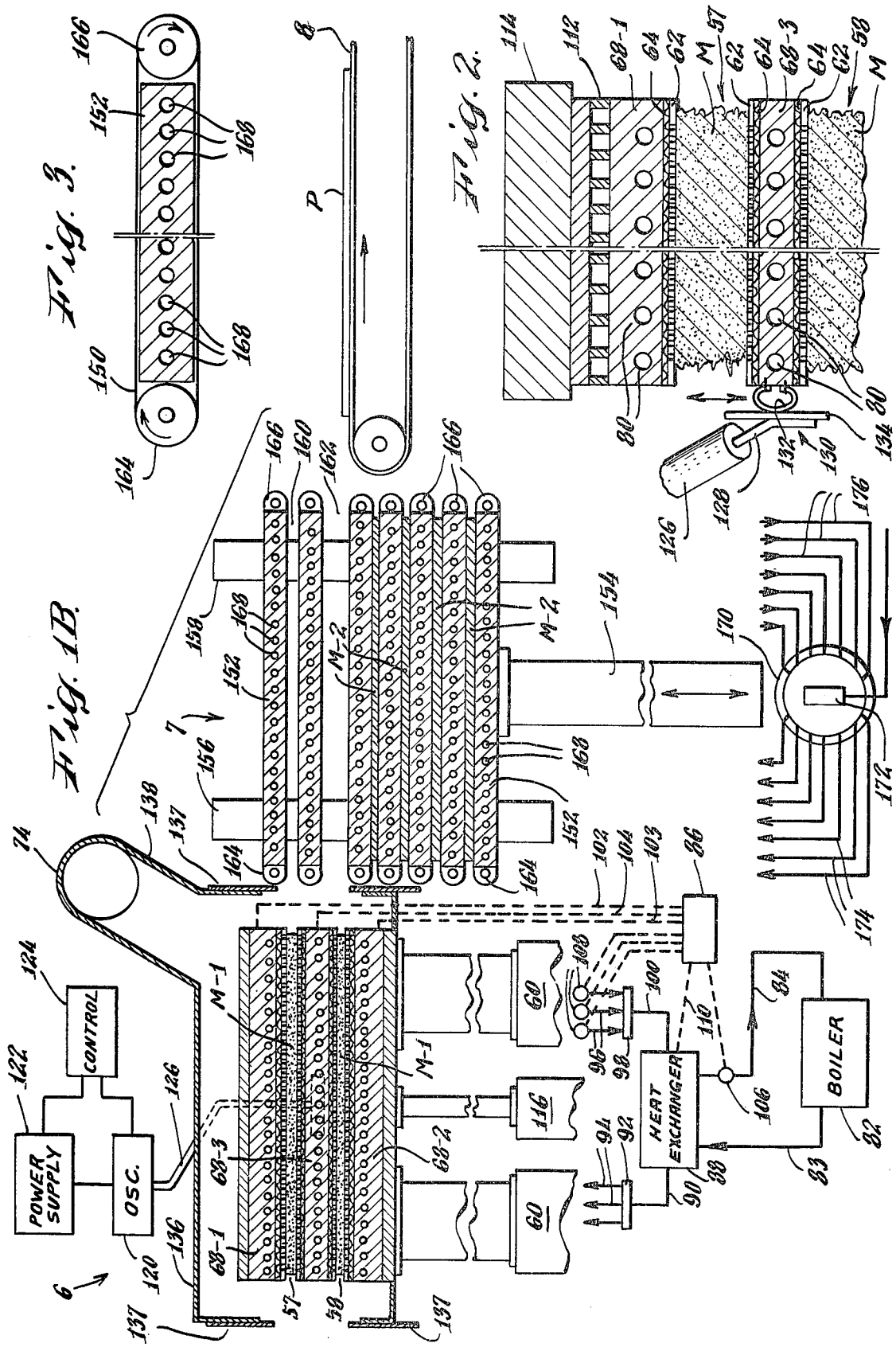

PRESS-REACTOR
STEAM, GAS AND AIR
EXPULSION

ELECTRICAL INSULATORS

PRESS-REACTOR
INITIAL FUSION
REACTION

PROCESS FOR PRODUCING FUSED CELLULOSE PRODUCTS

This application is a continuation of prior U.S. application Ser. No. 451,366, filed Mar. 14, 1974, now abandoned, which is a continuation-in-part of prior which is a continuation-in-part of prior U.S. application Ser. No. 293,559, filed Sept. 30, 1972, now abandoned, which was a division of U.S. application Ser. No. 76,759, filed Sept. 30, 1970, and now abandoned.

DESCRIPTION

The present invention relates to a process and systems for producing rapid dielectric and thermal fusion in cellulosic materials permitting use of minimum binder additives, if desired, for making products suitable for use under external exposure conditions; and for making structural utility products of superior strength for process applications in situations requiring high wet strength in boards, webs, mats or sheets.

There are prior art external cellulose containing products which are available todayk but these prior art products require the use of substantial quantities of exterior grade binders and usually require prolonged or extensive curing steps which keep these products at an excessive cost of production thereby restricting the commercial utility for such prior products. The marketing opportunities for such prior art products are further diminished because the ultimate selling prices are much higher. For example, exterior grade siding material resin bonded fiber boards made with large quantities of binders suitable to meet exterior requirements normally bring prices in the market about double the amount for interior grade fiber board products which are unacceptable for prolonged exterior exposure. Because of the higher cost of manufacturing materials suitable for external applications, these products are usually priced out of the range for many desirable applications for dimensionally stable products, such as for underflooring, durable packaging, transportation equipment, architectural uses, concrete form work, marine installations, agricultural shelters, the hand craft trades, and for precision industrial machine operations.

In accordance with the invention, cellulose containing materials such as wood fiber or vegetable fibers are permanently fused by subjecting the fibers to conditions which produce a new state of fusion and chemical combining under intensive thermal and dielectric heating while excluding oxygen and requiring little or no primary binder additives. The new state of fused cellulose is reached by introducing the cellulose containing materials having an equilibrium moisture content in the range from 2% to 50% and preferably in the range from 3% to 12% into an oxygen-excluding reaction station having a controlled ambient temperature in the range from 450° F. to 800° F. and wherein dielectric energy is applied in conjunction with the high ambient temperature at an intensive level as described, depending upon the nature of the cellulosic materials and the rate of fusion reaction desired. The ambient temperature is well beyond the normal cellulose carbonizing temperature and cellulose combustibility at temperatures of about 400° F. Specific exposure of the cellulose containing materials to this elevated ambient temperature in the reaction station is accurately controlled to provide an exposure time usually less than 120 seconds depending upon the initial equilibrium moisture content, and preferably the exposure time is less than 90 seconds to minimize possible carbonizing of the cellulosic components. As quickly as possible, the fused cellulose containing material is transferred to an oxygen-excluding hot stacking station where a continuation of the initial fusion reaction is carried out under controlled temperature conditions and retained heat while oxygen is excluded. The dwell time in this hot stack station is substantially longer than the exposure time in the reaction station while gradually reducing the temperature of the completed product to a temperature level suitable for atmospheric transfer.

Among the many advantages of the present invention are those resulting from the fact that the unique fused cellulosic products described are enabled to be produced. The quick fusion between the cellulosic components differs from conventional processes in which primary binders or additives are employed, such as glues or adhesives required to obtain fiber bonding and wet strength in cellulose. The invention avoids not only the cost of the binder additives but circumvents the many related restrictions and costs directly attributed to processing of such binder additives. Moreover, the fused cellulose material of the present invention is more stable and equally as strong or stronger and more weather-resistant than boards produced by expensive commercial interior synthetic resin and glue binders, such as ureaformaldehyde and other adhesives which are conventionally used for fiber bonding.

It will be understood that specific enhancers or fillers may be employed in the practice of this invention for specific purposes, if desired, such as surface improvements, greater water repellency, wet-strength additives, preservatives against attack by mold, termites, and release agents to facilitate opening of forming die elements, catalysts, solvents, resins, hardeners, pH control, coatings and the like.

The various aspects, objects and advantages of the present invention will be more fully understood from a consideration of the following description in conjunction with the accompanying drawings, in which:

FIG. 1 (which comprises FIGS. 1A and 1B taken together) is an elevational view with portions schematically illustrated, of a system including a fiber former, press reactor station with dielectric shielding and oxygen-excluding fusion reaction continuing hot stack station for producing the dielectric and thermal fusion of the cellulose component of material handled in the system. It is noted that FIG. 1 is spread out onto two sheets for clarity of illustration, and to view the whole drawing, FIG. 1A is placed to the left of FIG. 1B with the two sheets in end-to-end relationship.

FIG. 2 is a cross-sectional, elevational view, shown on enlarged scale, of a portion of the press reactor with a cellulosic product therein.

FIG. 3 is a cross-sectional, elevational view, shown on enlarged scale, of a portion of the oxygen-excluding hot stacking station.

FIG. 4 illustrates a smoothing station containing calendar rolls in a further step which may be carried out to make a smooth two-sided product without sanding.

Figure 5:
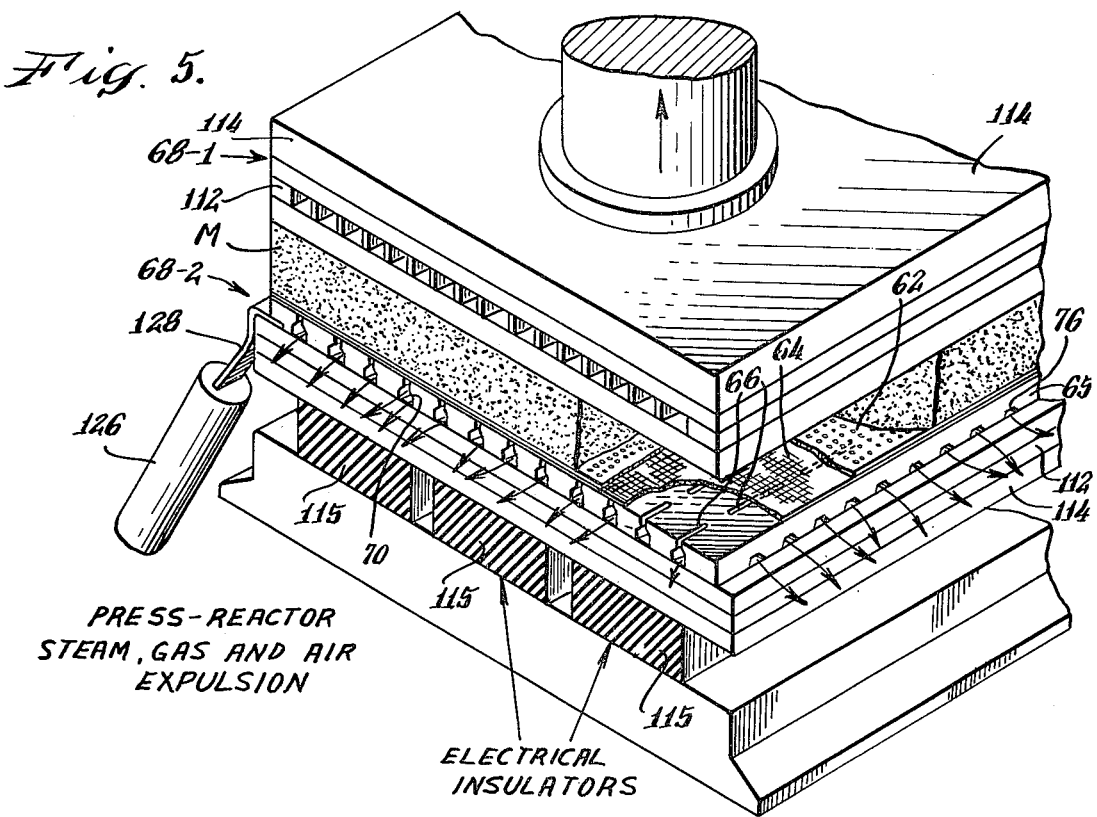
FIG. 5 is a perspective view of the press reactor station, showing the explusion of steam, gas and scavenging of air at the beginning of the treatment of the cellulose-containing material.

Referring to the drawings generally, showing a system for carrying out the process of this invention, there is included a fiber mat former station 2, and a mat pre-presser station 3 may optionally be included for producing an initial compression and densification of the fiber mat. A cut-off station 4 cuts the mat into predetermined lengths which pass into loading means 5 for loading into the press reactor station 6 (FIG. 1B). From the output of the press reactor station 6, the fused fiber products are fed as quickly as possible into an oxygen-excluding temperature-controlled hot stack station or zone 7 for furthering the reaction while gradually reducing the temperature of the completed product P to a temperature level suitable for passing onto an off bearing conveyor 8. For smooth two-sides board products, as shown in FIG. 4, the boards are transferred on conveyor 8 through a smoothing station 10, shown as containing a pair of opposed, smooth pressure exterting rolls.

As shown in FIG. 1, the cellulose containing fiber material 11, such as wood fiber or vegetable fibers or mixtures of them, is fed from a suitable supply source shown as a pair of hoppers 12. The fiber material 11 has been prepared by suitable preliminary steps. These fiber preparation steps may advantageously be such as are set forth in my prior Pat. No. 3,533,906, issued Oct. 13, 1970.

As a first step in the process of this invention, the fiber material 11 has been dried to an equilibrium moisture content within the range of 2% to 50% and preferably in the range from 3% to 12%. This drying is carried out before the fiber material 11 is introduced into the hoppers 12. If it is desired to include additives, as discussed above, or fillers, they are preferably added to the fiber 11 before it is introduced into the hoppers 12. Such fillers may include organics or inorganics, including cellulosic wastes such as rice hulls, walnut shells, cotton stems, straw, or mineral derivatives, mica, bauxite or alumina, Portland cement, silica or binders for the above, and the like.

Conveyor belts 14 feed the cellulose containing fiber material 11 from the hoppers 12 into feed chutes 16 leading down into the fiber mat former station 2. This former station includes a housing 20 enclosing a fiber fluffing, agitating and distribution chamber 22. Within the agitation chamber 22 are a plurality of rotating agitators 24 each of which turns about a horizontal axis and has a plurality of radially extending revolving arms as indicated. In this manner, the individual fibers are formed together, i.e. being generally uniformly distributed, fluffed and thoroughly interlaced and intermixed as they fall down through the open bottom 26 of the housing 20. The interlaced fibers build up into a loose formed mat 28 upon a porous conveyor belt 30 which is positioned beneath the housing 20.

This conveyor belt 30 passes around main rolls 32 and 34 at each end and is held taut by several belt-stretcher rollers 36 which engage the lower stretch of the belt. Suction boxes 38 and 40 may optionally be utilized beneath the belt 30 in the mat former station 2, and they may serve to de-water the fiber. These suction boxes 38 and 40 serve to aid in forming the mat 38 of interlaced fibers upon the belt 30. If a suitable mat 28 can be formed without the suction boxes, then they are omitted. This belt 30 is preferably formed of woven wire screening, but other porous belt materials can be used, such as woven Nylon or perforated metals. If the suction boxes 38 and 40 are not used, then the belt 30 can be formed of any durable flexible material, and need not be porous.

The fiber mat former 20 can be employed to advantage, as described above, but it is to be understood that the process and system of the present invention, as claimed, are not limited to this particular construction of a fiber mat former. There are commercially available mat formers, which can be employed if desired to lay down a fiber mat 28 on the belt 30. These commercially available mat formers are of the stationary type and travelling type. After the desired thickness of fiber material 28 has been built up on the belt 30, drive means 41 are actuated to advance the belt 30 a distance equal to the length of a mat M plus the length of the portion 43 which is removed in the cut-off station 4.

As the mat 28 is moved along by the belt 30, it may optionally be passed through a rolling pre-presser station 3 for producing an initial compression and densification of the fiber mat 28, if desired. The rolling pre-presser station 3 is shown as including a main presser roll 42, a smaller lead roll 44 which is spaced further from the belt 30 than the roll 42 and a presser belt 46 passing around these rolls and beneath a downwardly sloping guide shoe 48. Alternatively, a vertical acting press-type pre-presser station 3 can be used, or a series of pressure rolls for compacting the mat 28.

The formed mat 28 is cut into predetermined lengths by a dual cut-off saw 50 and 51 in the cut-off station with the removed portion 43 being drawn off by a suction disposal duct 53 associated with the cut-off station 4. The individual cut mats M enter the respective levels of a stacker-loader 5.

This stacker-loader includes elevator means 52 and a plurality of conveyor levels 54 and 55 which can be raised and lowered by the elevator means 52. The stacker-loader 5 includes small conveyor belts 56 and 59, as shown at each level, which serve to feed the cut mats M into the loader 5 and also to feed the mats M into the respective openings 57 and 58 of the press reactor station 6. The stacker-loader station 5, as shown is preferably of the no-caul type, because it is not necessary to use pallets or cauls in the transfer of the mats M.

This stacker-loader 5, as shown, can be used to advantage as described, but it is to be understood that the process and system of this present invention as claimed are not limited to any particular stacker-loader structure. For example, in the case of a single opening press reactor station, the belt 30 can be extended so as to pass through the single opening of the press reactor station such that the extended portion of the belt 30 would serve as loading means. In the latter case, the belt 30 is held stationary during the periods of time when the press reactor station is closed, while the mat forming may proceed during the press-reactor cycle.

As soon as the cellulose containing fiber mats M are loaded into the respective openings 57 and 58 of the press reactor station 6, the multiple powerful hydraulic cylinder and piston drive units 60 are actuated to close the press reactor onto the mats M. At the moment when the press reactor station first closes, these mats M have an equilibrium moisture content in the range from 2% to 50%, and preferably in the range from 3% to 12%, as mentined above. The reason for having this particular preferred range of equilibrium moisture content will be explained below.

The press reactor station 6 has a structure to scavenge oxygen from within the mats M while effectively excluding entry of further oxygen during the fusion reaction. At the time when the mats are first introduced into the press reactor station, they are of relatively low density containing relatively great amounts of air in the interstices of the mat. A usual thickness of the mats M at this instant of closure is from 3 inches to 8 inches, for making a board product one half of an inch thick, depending upon the ultimate density of the product desired to be made.

As shown on enlarged scale in FIG. 2, there are thin metal microperforated caul sheets 62 having a multitude of minute perforations through them which engage at least one surface of each mat M. Behind each sheet is a support member 64 to permit lateral escape of the steam, expelled gases and entrained air which pass through the minute perforations in the sheets 62. In FIG. 2 the support members 64 are shown as being woven wire screen. Screens 64 of the woven Fourdrinier wire type are to be preferred as compared to common hardware screening because more clearance spaces are provided for escape of the steam gases and air. These perforated sheets 62 (FIG. 2) are made of a material having noncorrosive characteristics, strength and durability to withstand the elevated temperature, such as stainless steel. These sheets 62 are preferably thin so as to provide better heat transfer from the high temperature press platens, as will be explained. They are sufficiently strong and are firmly supported by the support members 64 to as to provide stable support for the adjacent fiber surfaces, thereby giving better strength to the product and providing better heat transfer than screen wire alone. Also, the smooth sheets 62 with minute openings avoid the fiber loading clogging problem of screen wire alone, as caused by the compressive forces applied. The sheets 62 are substantially uniformly perforated by a multitude of minute openings which can be produced chemically or mechanically in the thin sheet material.

The purpose of these multiple minute openings is to allow the internally generated steam and gases of reaction to escape through at least one surface of each mat as it is being reacted in the press reactor station and to expel the entrained air from within each mat M along with the steam and gases, thus advantageously eliminating available oxygen from within the mats M.

I have found that sheets 62 in which the sum total area of the porosity of the perforations occupies at least 20% of the face area of the sheet are preferable to provide adequate escape area for release and expulsion of the steam, gas and air through the adjacent surface of the mat M. In FIG. 2 the screens 64 are shown adjacent to both surfaces of the mats M, thus effectively doubling the escape area.

The advantage of using microperforated sheets 62 with a multitude of minute perforations, preferably less than three thirty-seconds of an inch in diameter, is that they allow the steam, gases of reaction and entrained air to escape without later permitting any significant re-entrance of air to the high temperature cellulosic materials being fused. Moreover, the resulting surface of the fused product has the characteristics such that a board product P can conveniently be converted into a commercially smooth two sides board without sanding operation. Thus, none of the material is wasted, as occurs in the conventional prior art today which requires power driven wide sanding belts or sanding rolls to produce a commercially smooth two sides board.

Instead of using only the screen back-up members 64, machined plates 65 having multiple surface slots 66 can be employed as a back-up on the bottom for the porous sheets 62, as shown in FIGS. 5, 6, 7 and 8 to permit more rapid expulsion of large volumes of water and moisture should this be desirable.

Machined plates 65 of metal of high heat conductivity, such as aluminium, having a thickness of one eighth of an inch up to three fourths of an inch, have been employed successfully by me for treating materials containing high volumes of expressible fluids. These plates 65 have parallel milled channels 70 in their reverse surface which communicate with the face surface slots 66. The face surface slots 66 are preferably less in width than the channels 70 to avoid overloading of the channels 70 by the escaping fluids. The face slots 66 are not continuous, but they are interrupted by bridging portions 72 which permit the plates 65 to withstand pressures up to 3,000 pounds per square inch (p.s.i.). The channels 70 serve as manifolds to control the direction of the expelled fluids into exhaust or recovery means 74 (FIG. 1B). The recovery means 74 can be located below the level of the reactor station 6, if desired, for recovery of liquids or gases. Cross channels 76 (FIGS. 7 and 8) may be optionally provided for the purpose of obtaining a multi-directional out-flow of the fluids. Alternatively, the surfaces of the press platens 68 can be scored or machined to provide slotting or channeling for expulsion of fluids. It is preferred to use the plates 65 of material of high heat conductivity and easy maintenance thus protecting the press platens against damage while providing the rapid heat conductivity desired for maintaining the intensive heating while simultaneously providing expulsion of the fluids. The plates 65 are preferably removably attached to the press platens.

The plates 65, when made relatively thin and interlocking in construction, or in a strip form, can serve as a transfer belt for continuously conveying mats or webs into the press reactor station 6, if desired. Alternatively, the plates 65 can serve individually as transfer cauls.

The plates 65 can be used on the bottom of the mats or webs M without screens 64 or porous sheets 62, or where the resulting pattern produced on the face of the product may be employed to advantage.

Figure 7:
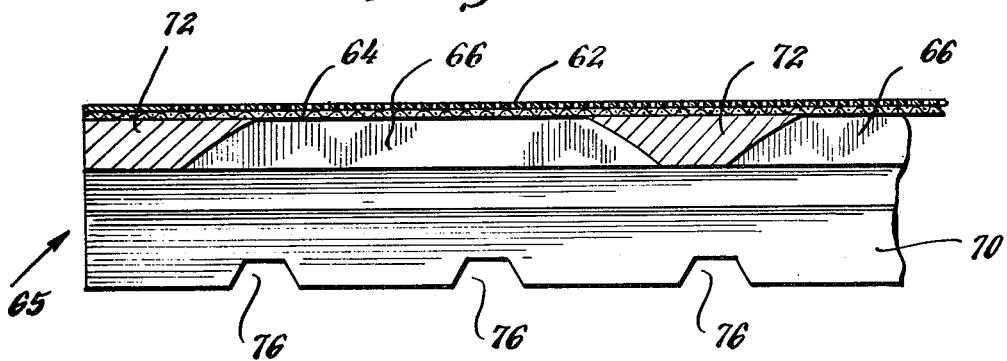
FIG. 7 is an enlarged elevational, sectional view of an assembly as seen in FIGS. 5 and 6 of a thin perforated metal sheet, a screen back-up member and a machined plate back-up member of metal of high heat conductivity having multiple slots for permitting more rapid expulsion of water and moisture, if desired.
Figure 8:
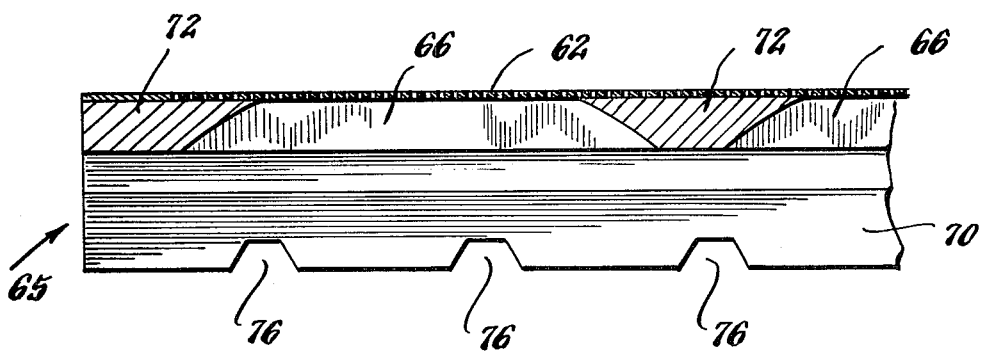
FIG. 8 is an enlarged elevational, sectional view similar to FIG. 7, except that the screen back-up member is omitted.

FIG. 5 is a general view showing a slotted plate 65 in position at the bottom of an opening in a press reactor with a perforated porous sheet 62 plus a screen 64 on top of the plate 65, as illustrated in detail in FIG. 7.

Where the perforations in the perforate sheet 62 are slightly larger, the sheet 62 can be employed directly in conjunction with the slotted plte 65, as shown in FIG. 8.

The machined plates 65 are particularly useful when webs or mats M containing volumes of liquids are being handled such that the equilibrium moisture content is above about 30%. In this case, some pressure is desirable to maintain the integrity of the mats while expressing free liquids through the slots 66. The initial moisture expulsion is followed immediately thereafter by intensive thermal and dielectric heating. The system in this respect provides ample safety features to allow expulsion of accumulated stem and gases of reaction. This exceptional flow-out encountered in those instances where exhaust system 65, 66, 70, 74 are used has proven to me to be advantageous in achieving extremely fast drying and fusing of wet-formed cellulosic materials in short time spans of less than 120 seconds for mats of up to 3 pounds per square foot basis weight in final products of up to one inch in thickness.

For fusing products containing up to 20% moisture content, I have found that the slotted plates 65 may be eliminated by using a porous perforated sheet 62 together with a back-up screen member 64, as shown in FIG. 2.

The press reactor station 6 includes an upper reactor platen element 68-1, a lower platen element 68-2 and an intermediate platen element 68-3. Each of these platen elements is made of metal and contains passages 80 for circulating hot oil having a temperature in the range from 450° F. to 800° F. to provide controlled high ambient temperature conditions adjacent to the material M being fused.

Where the plant installation may conveniently employ a boiler 82 (FIG. 1B) for hot water or steam at 300° F. to 400° F., such heating has been employed in a system for practicing this invention by directing the steam or hot water through circulating lines 83 and 84 connected with suitable control means 86 ito one side of a heat exchanger 88. Additional heating at the temperature of 450° F. to 800° F. is introduced in the opposing side of the heat exchanger 88 to heat the hot oil. The additional heating can be maintained conveniently through use of electrical resistance heating elements immersed in the oil, or through alternate heat sources such as gas or oil-fired heaters.

The hot oil thermal fluid has the advantage at these temperatures of 450° F. to 800° F. of being circulated at pressures of usually less than 90 p.s.i. whereas an attempt to reach these temperatures using circulating steam or pressurized water would involve an excessively high pressure system. The hot oil circulates from the heat exchanger 88 through a line 90 to a distribution header 92 feeding into three flexible lines 94 feeding into the respective passages 80 in the press reactor platen elements 68-1, 68-2 and 68-3 which serve the dual functions of high temperture radiators and electrodes for intensive dielectric heating under high temperature ambient conditions. The return flow of the hot oil passes through the flexible return lines 96 into a return header 98 and through a return line 100 leading to the heat exchanger 88.

The control means 86 includes temperature sensing means 102, 103 and 104 for effectively sensing the temperature of the respective reactor platen elements 68-1, 68-2 and 68-3. The control means 86 controls a circulating pump 106 for the hot water or steam. It also controls three individual circulating pumps 108 in the respective return lines 96 and also controls the temperature being maintained in the heat exchanger 88, as indicated by the dotted line 110.

Figure 6:
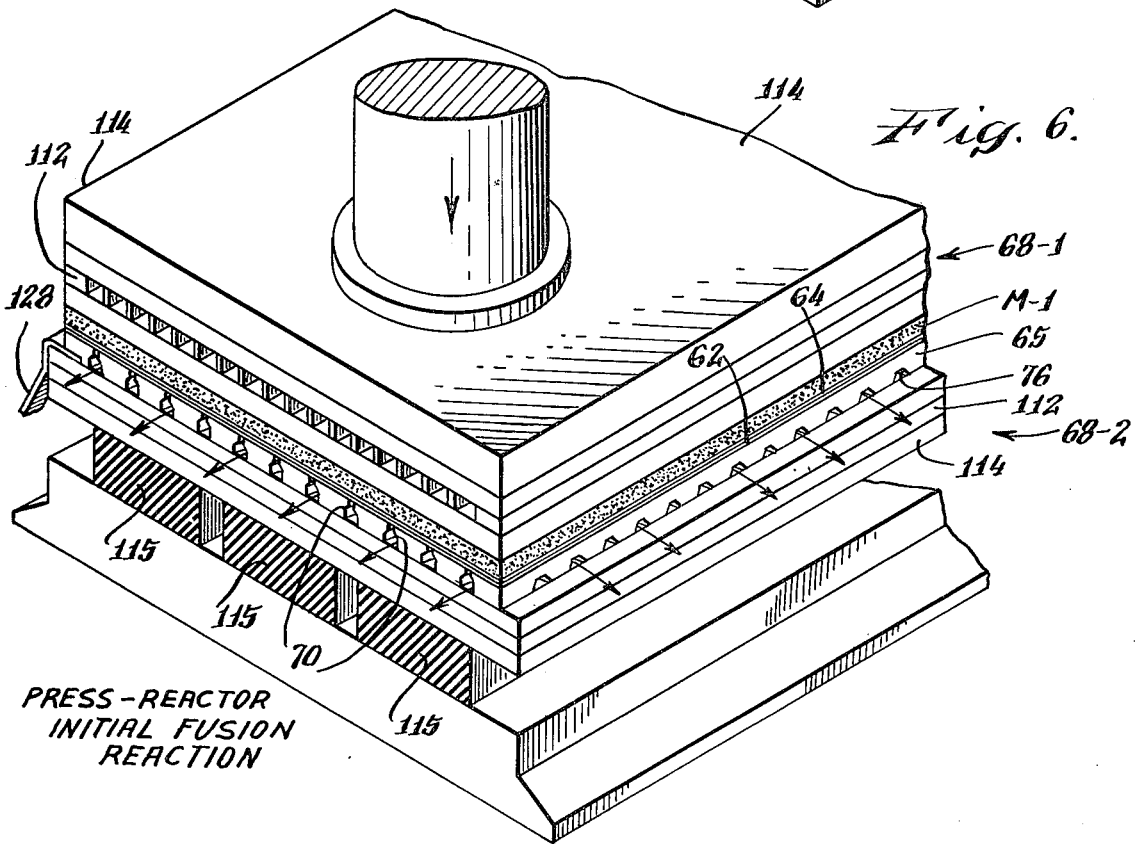
FIG. 6 is a perspective view of the press reactor station at a short time after FIG. 5, showing the press platen members moved closer together and the initial fusion reaction occurring.

In order to maintain stress-free operation of the upper and lower press reactor platen elements 68-1 and 68-2 and to minimize loss of heat by conduction into the adjacent structure, wherever possible it is advisable to employ grid sections 122 (FIG. 2) having a ribbed or drilled configuration. These grid sections 112 can be constructed by multiple metal bars or strips placed on edge to provide strength sufficient to support uniform compressive loading while minimizing heat conduction. These grid sections 112 are preferably placed adjacent to a temperature stabilized backup plate 114 to assure stress-free operation of the reactor platen elements 68-1 and 68-2, which is advantageous in close tolerance production work. If it is desired to feed the radio frequency (R.F.) energy to the upper or lower reactor platen element 68-1 or 68-2, of a single-opening press reactor station, as shown in FIGS. 5 and 6, then the temperature stabilized plate 114 is separated from the electrically grounded frame structure by heavy insulators 115. These insulators are not shown in FIG. 2 because the R.F. energy is fed into the intermediate or center reactor platen element 68-3, as shown.

The piston unit 116 serves to retract the drive units 60 to open the press reactor station 6 when desired.

In order to feed R.F. energy into the press reactor station 6, there is a radio frequency oscillator 120 which is energized by a power supply 122. A control station 124 is connected to control both the power supply and the oscillator. This station 124 controls the power output of the oscillator 120 and its operating conditions.

The output from the oscillator 120 feeds through a cable 126 having a conductive core 128 (FIG. 2) connected to a sliding electrical connection 130. The conductive core 128 is the output lead from the oscillator 120. As shown, there is a resilient spring contact 132 of beryllium copper straps bent into a circular spring configuratin, the exterior of which maintains a sliding contact with a stationary contact bar 134. In this manner, R.F. energy is supplied to the center reactor platen element 68-3, thus supplying R.F. energy equally to the mats M in both openings 57 and 58 of the press reactor station 6.

Surrounding the press reactor station is shown a conductive metal enclosure 136 for electrical shielding to minimize R.F. radiation. Suitable duct work 138 is provided to carry away the steam, gases of reaction, and entrained air. This shielding enclosure 136 also excludes access of free atmospheric air in the vicinity of the press reactor station 6. The presence of this shielding enclosure 136 further reduces the possibility of carbonizing of materials M under treatment along any exposed edges. Sliding access doors 137 are provided for loading and unloading the press reactor station.

Through this combination of conditions as described, the highly effective application of R.F. energy is concentrated for rapid treating of the material M. It is noted that the hot reactor platen elements 68-1, 68-2 and 68-3 tend to heat the two surfaces of the material M-1, for the cellulosic fibers therein are not a good conductor of heat. Thus, the interior of the material M-1 tends to lag behind the elevation in temperature of the surfaces of this material M-1. Moreover, the thicker this material M-1, the more that the interior tends to lag behind the rise in temperture of the surfaces. Also, the presence of moisture in the interior of the mat tends to cause the interior to lag behind the surfaces in temperature rise. The R.F. energy serves to supply heat energy into the interior of the material M-1 while at the same time the hot reactor platen elements are heating the surfaces thereof by thermal heat flow. By the combined effects of the hot press reactor platen elements plus the R.F. energy, a rapid dielectric and thermal fusion of the cellulosic constituents in the material M-1 is accomplished.

The process enables cellulosic material M-1 to be fused together at temperatures in excess of 450° F. in an overall R.F. energy exposure time cycle of less than 120 seconds and often less than 60 seconds for thinner products. However, for general cellulose treatment in accordance with the invention, an allowance of up to 60 seconds per one fourth inch thickness of final product will accommodate a wide range of product densities and thicknesses under typical moisture conditions, such as those varying from about 5% up to 50% volume of water by weight relative to the total material present on an oven-dry basis weight. Glues or binder additives were not found to be necessary, but can be used if desired to provide added strength under weathering, severe exposure or soaking conditions. I have successfully used a number of additives within the scope of my invention. However, I have found that the urea-formaldehyde type of synthetic resin binder is not acceptable because of the deterioration which occurs under the high temperature conditions of the fused fiber process and system of this invention. Please note that I have found that fused fiber products produced by the process of this invention and without any wax, binder or other additives whatsoever have successfully passed the six-cycle accelerated aging test portion of the exterior requirements for board products for FHA approved materials.

I hve successfully fused cellulose with 45 seconds of R.F. energy exposure time to make wood fiber boards of one fourth inch thickness at 60 pounds per cubic foot basis weight starting with an equilibrium moisture content up to 12% in the fiber mat M and without using any glues or binder additives whatsoever, but such can be used if desired.

The mats M may contain filler materials, such as minerals, silica, industrial solid wastes or agricultural wastes, vegetable fibers, and the like.

Standard ball hardness tests for particleboard when carried out on the surfaces of products may by the process of the present invention having densities in the range from 45 lbs. to 65 lbs. per cubic foot made with wood fiber without fillers, glue or binders, showed test results of 1,000 lbs. to 3,000 lbs. thus resisting surface damage for applications as flooring or for furniture and providing a superior sub-strata base for extremely thin laminations and machine coatings. The products have uniformly solid edges which may be readily machined and naturally finished.

Fused wood fiber boards made by this process with R.F. energy exposure time of less than 120 seconds and no glue or binders added have successfully passed the 6-cycle accelerated aging test specified as one of the essential quality requirements for products acceptable for exterior use by the U.S. Federal Housing Administration.

This process thus enables a high product rate of throughput, at increased efficiency with such shortened time exposures to R.F. energy, whereby the high ambient thermal and intensive R.F. heating conditions are combined in the absence of oxygen to provide the basis for new low cost economic factors in the use of R.F. energy, and making possible permanently fused products at a surprising savings in cost through the elimination of glues or binder additives, if desired, as described herein.

Prior art R.F. heating installations have been employed over extended time cycles, usually of 3 to 6 minutes, usually to reach treating temperatures in the range from 250° F. to 400° F. while requiring removal of moisture from wood chips and glue, causing the ambient conditions to further degenerate in the prolonged presence of entrapped steam acting as a coolant throughout the steaming cycle. Also, these prior art installations have not provided for the escape of steam which is usually being generated. Thus, the water entrapped in such prior art installations is slowly dissipated through the edges of the product at a waste of time and energy in cooling the platens and absorbing the R.F. energy away from the materials under treatment. In the prior art, R.F. energy is required over long time periods at high cost to overcome the water and steam and the resulting cooling of the adjacent platen electrodes. As can be seen, the cost of using R.F. energy under the restrictive conditions of the prior art described, including the added cost of large quantities of binders required for bonding, gives clear evidence of the surprising advantages of the present process.

Another advantage of the present invention is that the elimination or reduction of glues or binder additives avoids the abrasiveness of such additives which cause prior art problems in wear of production cutting tools and high machining costs.

The material M begins to be heated immediately upon introduction into the press reactor station 6 by thermal heat flow from the high temperature reactor platen elements 68-1, 68-2 and 68-3, causing expulsion of the steam and volatiles to commence. The R.F. energy is activated when the hot reactor platen elements 68-1, 68-2 and 68-3 and their associated elements 62, 64 or 65, if any, are in close contact with the surfaces of the material M.

For example, I have found that the optimum conditions prevail when there is a slight initial delay in activation of the R.F. energy for a brief period after the hot reactor platen elements 68-1, 68-2 and 68-3 and their associated elements 62, 64 or 65, if any, are brought into close contact with the surfaces of the material M. For optimum conditions, this initial delay period should be long enough to allow sufficient steam to be generated to permeate the material M, or such that visible steam expulsion commences.

The purpose of this initial R.F. energy delay period is to commence scavanging the material M of air and volatiles and to start preheating it in the press reactor station before the R.F. energy is applied. I have found that this initial delay period in application of the R.F. energy does not exceed 45 seconds for optimum conditions in producing a wide range of densities and thicknesses of products, and usually a shorter delay period is used.

It is possible to apply pressure to the material M during this initial R.F. energy delay period. The lower the equilibrium moisture content initially present in the material M, the higher the pressures which may be used. I have used increasing pressures up to 2,800 p.s.i. when the initial equilibrium moisture content was near 12% without subsequently reducing the pressure or backing off the press pressure to permit the active steam to escape thus preserving the integrity of the original interlaced fiber formation and thus avoiding disturbance or rupture of the fused cellulose weldments being made.

The prior art step of interrupting the press cycle by opening the press at an intermediate stage, called "breathing the press", to allow entrapped steam to escape is eliminated, and thereby avoiding interruption of the fusion reaction, because there is continuous breathing of the press to release steam or gases as they are being generated. The advantage of applying pressure during the initial R.F. energy delay period is that it enables a shorter overall dwell time to be used for the material M in the press reactor station because it improves the heating and fusion characteristics of the fibers one to another as they are brought into closer contact at the points of fusion contact between interlocked fibers. The continuous breathng of the press is advantageous in preserving the integrity of original fiber formation without disruption or damage as occurs from opening the press at an intermediate stage. This continuous breathing permits continuous temperature rise to high temperatures without excessive internal pressure build-up from steam or gases. The continuous breathing avoids the delays as well as the process and product defects of the prior art occasioned by entrapped gases and steam.

Whatever pressure level is applied in the press reactor station 6 in this initial R.F. energy delay period is preferably increased during the immediately following stage when the R.F. energy is activated. The maximum extent of press closure is attained as the maximum temperature is reached in the material M at or near the conclusion of the application of R.F. energy. A state of plasticising and irreversible fusion of the cellulose is reached while oxygen is excluded at the time of attaining the maximum closure.

Typically, the R.F. energy is applied for a period of from 45 seconds to 120 seconds, while for dry materials under about 5% equilibrium moisture content or for thin sections, the R.F. energy may be applied for less than 45 seconds, to reach treating temperatures exceeding 450° F. in the cellulose material in the absence of oxygen.

Usually the press reactor station 6 is opened immediately after shutting off the application of R.F. energy. However, for improved hardness characteristics, the retention of the conditions for the state of advanced plasticising of the cellulose may be extended to a greater degree (depth into the product from both of its surfaces) by holding the press closed for a brief time after the R.F. energy is shut off.

The fused cellulose mats M-1 are transferred from the press reactor station 6 into the oxygen exclusion hot-stack station or zone 7 by charging conveyor means 56 and 59 (FIG. 1A) which insert the unfused mats M and by the conveyor means 150 (FIG. 3) operatively associated with the hot-stack plates 152. These plates 152 can be collectively raised and lowered by elevator means 154. Also, plate opening means 156 and 158 are provided for selectively separating and opening the plates 152 to provide for loading the fused mats into the hot stack station 7 and later for unloading them therefrom.

The plate opening means 156 and 158 include projecting retractable mechanical elements (not shown) which selectively engage the respective plates 152 to provide the openings such as at 160 and 162 which are aligned with the respective openings 57 and 58 of the press reactor station 6, for receiving the fused mats M-1.

The conveyor means 150 (FIG. 3) is shown as a wire belt travelling around rolls 164 and 166 at each end of the hot stack plates 152. At least one of the pairs of rolls 164 or 166 is driven by a motor. It is to be understood that the conveyor means 150 as shown is exemplary and other conveyor means such as multiple belts, rolls, tracks, or combinations of these, may be used so long as they exclude the oxygen when the hot stack plates 152 are closed.

The plates 152 serve to close off the faces of the fused mats M-2 from any contact with free air, thus assuring that oxygen is excluded from the fused mats M-2 during their dwell period in the hot stack station 7, thereby preventing the hot fused cellulosic mats M-2 from carbonizing or smoldering. In this embodiment, the dwell period of the mats M-2 in the hot-stack station 7 is approximately three times as long as the dwell period in the press reactor station 6. For example, if the dwell period is 120 seconds in the press reactor station 6, then the dwell period in the hot-stack station 7 is about three times that long.

During this dwell time in the hot-stack station 7, the fusion and chemical reactions are actively continued while the temperature of the fused mats M-2 is controllably reduced to a level below their carbonization temperature of about 400° F such that the fused cellulose mats M-2 thereafter can be safely handled in the free atmosphere without carbonizing.

Further an additional hardening of the fused mats M-2 occurs while cooling to room temperature after the products P are discharged from the hot-stack station 7.

The temperature of the hot-stack plates 152 is controlled by circulating a suitable fluid, for example, such as hot water or thermal fluid, through the passages 168. A temperature control source and circulating means 170 having temperature regulating means 172 serves to control the temperature of the circulating fluid and to feed it through flexible supply and return lines 174 and 176 connected to the passages 168 in the respective plates 152. The purpose of this circulating fluid is to maintain the plates 152 at substantially constant temperature to provide a controlled rate of reduction of temperatures in the mats M-2 during continued fusion reaction. Different densities and thicknesses in the mats M-2 will call for different controlled temperatures of the plates 152, as desired.

If an overall increased dwell period in the hot-stack station 7 is desired, then the number of plates 152 may be increased relative to the number of openings 57 and 58 in the press reactor station 6, and this increase also provides greater flexibility in operation of the overall system.

The combined heating and controlled temperature provided in stations 6 and 7 to the material M-1 and M-2, while oxygen is excluded, extends the overall chemical reaction and fusion of the cellulose by employing the cooling phase under controlled conditions following the initial reaction phase in the reaction station 6. Thus, in effect, the two cooperating stations 6 and 7 combine to provide a controlled temperatue cycle throughout the combined treating periods in the two stations.

The plates 152 preferably include metal of good heat-conductivity such as aluminum or copper to provide rapid transfer of heat and better temperature control of the mats M-2.

Although passages 168 are shown for conducting a suitable circulating fluid through the plates 152 for controlling their temperature, I have also successfully used plates 152, usually of aluminum, without fluid passages. This was accomplished by regulating the dwell time of the mats M-2 between these plates, and by using removable plates. These removable plates were suitably air cooled in a region adjacent to the hot-stack station 7. They also served to exclude oxygen while controllably reducing the temperature of the material M-2.

The hot-stack station 7 provides an oxygen-excluding zone for prevention of free air coming in contact with any portion of the hot cellulose fiber material M-2. To facilitate exclusion of oxygen, this station 7 may be surrounded with an enclosure (not shown) which is flushed with inert gas or gases, such as nitrogen or $CO_2$, if desired.

The products P are discharged from the hot-stack station 7 onto an off-bearing conveyor 8. This conveyor 8 may comprise a series of powered rolls.

If a smooth two sides board product P-1 is desired, the products P are passed between a pair of opposed smoothing rolls 178 and 180 (FIG. 4) under pressure in a smoothing station 10. These rolls 178 and 180 may be heated or not, as desired. They serve to compress the minute protrusions of fiber on the surfaces of the product P left by the perforated sheets 62. This advantageously produces a commercially suitable smooth two sides product.

For many applications this smoothing station 10 eliminates the need for an expensive and troublesome sanding operation inasmuch as the hardened fused fiber faces of the products P-1 become commercially smooth.

Smoothing flat press plates or platens or multiple rolls may be used instead of the opposed rolls in the station 10 for applying a smoothing compressive pressure on the protrusions.

Fungi suppressants and wood preservatives, such as pentachlorophenol, have been successfully employed in the process and system of this invention.

Figure 9:
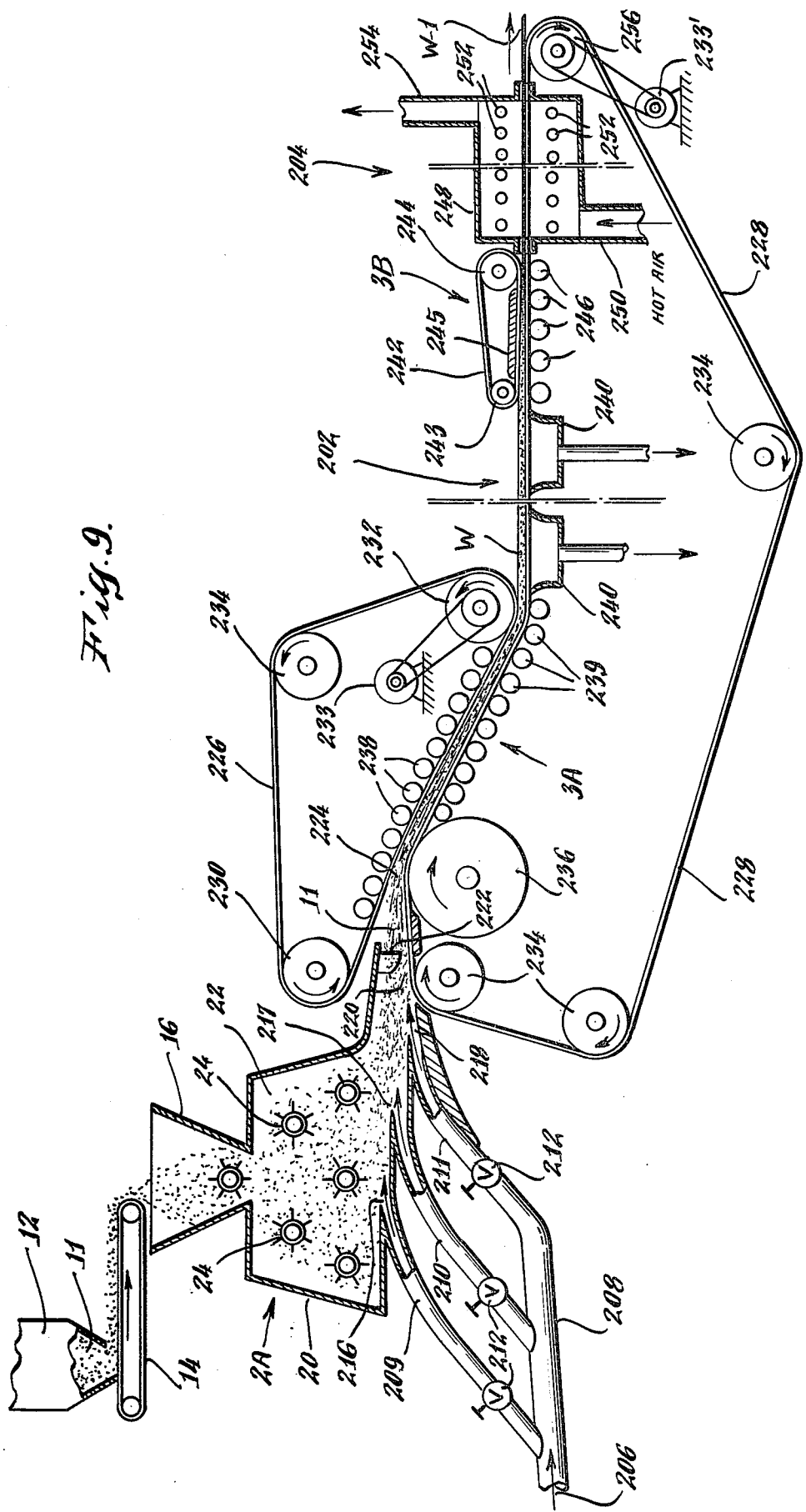
FIG. 9 is an elevational view with portions shown in section of a modified embodiment of a system including a fiber former, a suction de-watering station, a pressing station and a drying station.

As shown in FIG. 9, there are a fiber felting former station 2A, pre-presser stations 3A and 3B, a suction de-watering station 202, and a drying station 204. The cellulose containing fiber material 11, such as wood fiber or vegetable fibers or mixtures of them, and which may contain additives or fillers, as discussed in connection with FIG. 1, is fed from a suitable supply source such as a hopper 12. This fiber material 11 may be prepared by suitable preliminary steps as discussed in connection with the material 11 shown in FIG. 1 and has an equilibrium moisture content within the range from 2% to 50% and preferably in the range from 3% to 12%. A conveyor 14 feeds the cellulose containing fiber material 11 from the hopper 12 into a feed chute 16 leading down into the fiber mat former station 2A. This former station 2A includes a housing or headbox 20 enclosing a fiber fluffing, agitation and distribution chamber 22 including a plurality of rotating agitators 24 each having radially extending revolving arms. In this way, the individual fibers are formed together, being generally uniformly distributed, fluffed and thoroughly interlaced and intermixed in the chamber 22.

An air flow 206 is forced through a duct 208 leading into a plurality of smaller ducts 209, 210 and 211 whose flow can be individually controlled by valves 212 for feeding a plurality of air flow discharge nozzles 216, 217 and 218, located in the bottom of the headbox 20. These air nozzles 216, 217 and 218 are directed almost tangentially along the bottom of the headbox 20 and serve to propel the fiber material out through the mouth 220 of the headbox. A multiplicity of control vanes 222 may be included in the mouth 220 for providing a uniform distribution of the fiber containing material being propelled out through this mouth.

This material 11 issuing from the mouth 220 travels into the nip space 224 between a top web carrier 226 and a bottom web carrier 228. The top web carrier 226 is revolved around an upstream roll 230, a downstream drive roll 232 driven by a motor 233 and an idler roll 234. The bottom web carrier 228 converges with the top web carrier by passing up and over a main former roll 236 thereby forming the nip region 224.

In the continuous motion pre-presser station 3A, a plurality of back-up rollers 238 engage the top web carrier 226, and another plurality of back-up rollers 239 support the lower web carrier 228. These back-up rollers are positioned progressively closer together for squeezing the felted web W between the web carriers 226 and 228. Thus, the web W of formed felted fibers is well consolidated as it issues from beneath the top web carrier at the downstream roll 232. Some of the lower back-up rollers 239 may be positioned opposite the roll 232 for further compacting the felted web W before it leaves the region beneath the top web carrier.

The lower carrier web 228 is preferably a wide belt formed of woven wire screening, but other porous felt material can be used, such as perforated metals or woven Nylon, Dacron or polypropylene. The upper web carrier 226 is a similar wide felt which need not be porous but may be porous if desired.

The suction station 202 serves to hold the web W down firmly against the lower web carrier and may also dewater the web W. A plurality of suction boxes 240 are positioned beneath the web carrier in this station 202.

Another continuous motion pre-presser station 3B may be employed, including a presser belt 242 passing around upstream and downstream rolls 243 and 244 with a shoe 245 pressing the travelling web W down against the carrier 228 which is backed up by multiple rollers 246. Thus, the web W is consolidated in the pressing station 3B. It is to be understood that any suitable type of continuous motion pressing equipment may be used in the station 3B. For example, a plurality of opposed rolls could be used.

After leaving the continuous motion presser 3B, the bottom web carrier 228 and the web W pass through the drying station 204, which includes a housing 248 which may be heated by hot air entering through an inlet duct 250. If desired, the housing 248 may be heated by a plurality of infra-red radiation heating elements 252. Any water vapor which is driven off during this heating is discharged up through an outlet duct 254.

The web W-1 is now sufficiently well formed, felted and consolidated to be self-supporting, and it leaves the bottom web carrier 228 which curves down around a drive roll 256, driven by drive means 233'. It is to be understood that the upper and lower web carrier belts 226 and 228 are driven at the same speed. A common drive means 233, 233' may be effectively provided for these two carrier belts 226 and 228 by individually sensing their speed and controlling the respective drive means 233 and 233' to produce the same travel speed in both carrier belts. Alternatively, the drive means 233 and 233' may be mechanically ganged together so as to run at the same speed.

Figure 10:
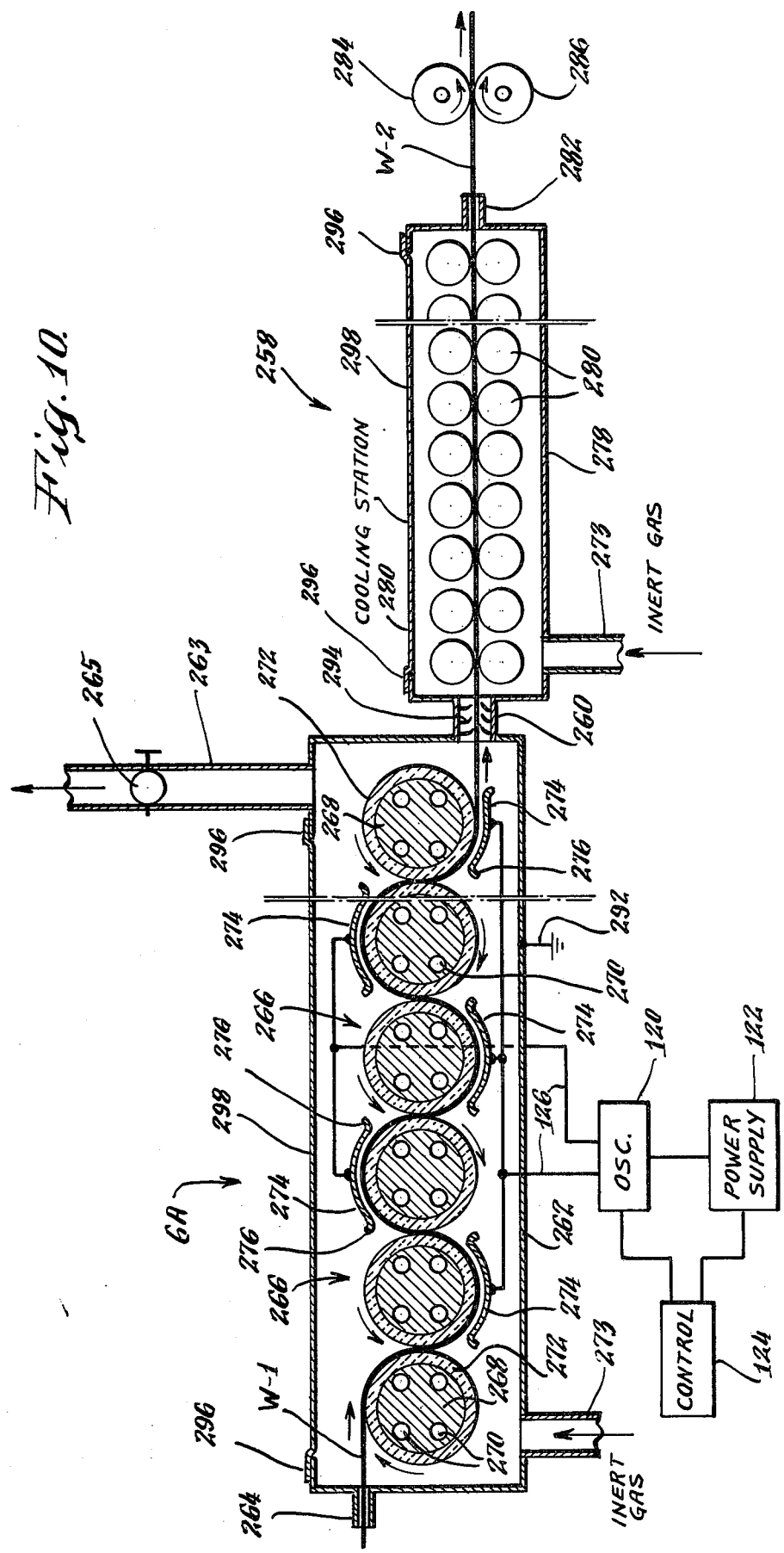
FIG. 10 is an elevational view with portions shown in section of a continuous motion pressing reactor station and a continuous motion cooling station.

As shown in FIG. 10, the web W-1 is led through a continuous motion press reactor station 6A and then through a cooling station 258 which are interconnected by a tunnel 260. Atmospheric oxygen is excluded from both the press reactor station and the cooling station so as to prevent carbonizing of the cellulose containing fiber web W-1 which is heated to a temperature from 450° F to 800° F in the reactor station 6A. This reactor station 6A includes a shielding housing 262 of electrically conducting material which is grounded and serves to minimize R.F. radiation. Suitable duct work 263 is provided to carry off the steam, gases of reaction and any entrained air. A control damper 265 is shown in the duct 263. This duct 263 is made sufficiently long and shaped like a stack, so that fresh air is prevented from entering the reactor housing 262 through this duct. The web W-1 enters the shielding housing 262 through a close-fitting tunnel entrance 264 for excluding air, and this tunnel may include flexible curtains (not shown) dragging on the web W-1 for providing a sealing action to exclude entrance of fresh air.

Within the housing 262, there are a plurality of heated press rolls 266 pressing and heating the travelling web to a temperature in the range from 450° F to 800° F for fusing the cellulose-containing material. Each of these press rolls 266 includes a metal core 268 having a plurality of passages 270 therein through which a hot oil thermal fluid is circulated. This hot oil thermal fluid may be heated and controlled at a temperature in the range from 450° F to 800° F in a manner similar to that described for the hot oil in the press reactor station 6, shown in FIG. 1B. A surface layer 272 of dielectric heat resistant material, for example, such as ceramic or vitreous enamel, coats the metal core of each roll and forms the roll surface for engaging the travelling web.

The web is festooned about the rollers, being wrapped up over the top of one roller and down under the bottom of the next roller, and so forth. As the web passes between each pair of rolls, it is pressed firmly between them. For excluding fresh air containing oxygen, an inert gas, i.e. one which does not support combustion of cellulosic material, for example, such as nitrogen or carbon dioxide, may be fed into the reactor housing 262 through a supply pipe 273. If sufficient heating is not being supplied to the travelling web W-1 by the hot rolls 266, such as for heavy paper boards or thicker fiber sections, as intensive interior heating action may also be provided by feeding R.F. energy into the travelling web.

In order to feed R.F. energy into the reactor station 6A, there is a radio frequency oscillator 120 which is energized by a power supply 122. A control station 124 is connected to control both the power supply and the oscillator. This station 124 controls the power output of the oscillator 120 and its operating condition. The output from the oscillator 120 feeds through a pair of cables 126, for example, such as the cable shown in FIG. 2 at 126. These cables are connected to a plurality of cylindrically-shaped, electrically-conducting metal electrodes 274 positioned concentrically with respect to the axes of rotation of the respective press rolls 266 and located near to the travelling cellulosic web. Thus, the electrodes 274 are positioned respectively above and below the press rolls 266, so as to be positioned near to the festooned web.

These electrodes 274 are made of a highly conductive metal or alloy such as aluminum or brass, and their edges are bent back farther away from the nearby web, as shown by the curved electrode edge portion 276. The electrode configuration is arranged to provide an intense radio frequency(R.F.) energy field passing through the cellulose fiber containing web. The metal cores 268 of the rolls are electrically grounded so as to act as the opposed electrodes cooperating with the concentric cylindrical electrodes 274. The thickness of the dielectric layer 272 is chosen to achieve the maximum R.F. heating effect in the interior of the cellulosic web. The thicker this web, the thinner the dielectric layer 272. By the combined effects of the hot press reactor elements 266 plus the R.F. energy, a rapid dielectric and thermal fusion of the cellulosic constituents in the web W-1 is accomplished. The cellulosic material in the web is fused together at temperatures in the range from 450° F to 800° F in the reactor station 6A to produce a strong fused paper or carboard web product W-2.

The product passes through the tunnel 260 into the housing 278 of the cooling station 258. A plurality of cold rolls 280 engaging the top and bottom surfaces of the travelling product W-2 serve to cool it down to a temperature below 400° F before the product issues through an exit tunnel 282 and passes between feed rolls 284 and 286. The exit tunnel 282 may contain flexible sealing curtains (not shown) dragging on the web product to prevent fresh air from entering the housing 278, and an oxygen excluded zone is provided in the cooling station 258.

Figure 11:
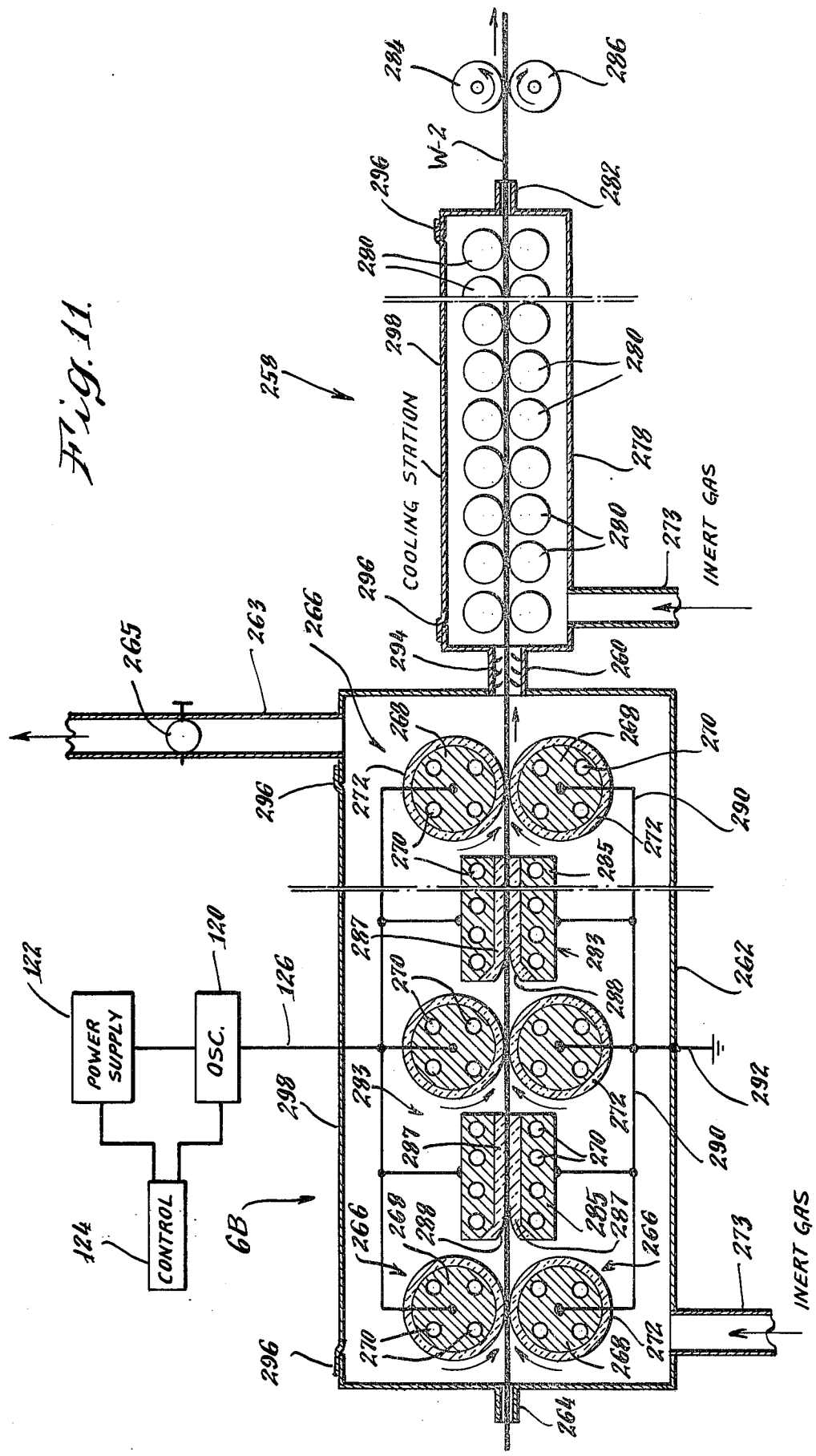
FIG. 11 is an elevational view with portions shown in section of a modified embodiment of a continuous motion pressing reactor station and a continuous motion cooling station.

FIG. 11 illustrates an alternative embodiment of a continuous motion press reactor station 6B. In FIG. 11, elements performing functions corresponding to those of elements in FIG 10, have corresponding reference numbers and so the description of these elements will not be repeated. In the press reactor station 6B, the cellulosic web W-1 travels along a generally straight path. There are opposed pairs of heated press rolls 266 between which the travelling web W-1 is passed. These rolls 266 have dielectric coating layers 272 on metal cores 268 heated by hot oil thermal fluid in passages 270 to a temperature in the range from 450° F to 800° F.

Also, hot reactor plate elements 283 are positioned in opposed pairs above and below the travelling web W-1. These hot reactor elements 283 include metal plate cores 285 covered by dielectric layers 287 made of dielectric material similar to the layers covering the rolls 266. Hot oil thermal fluid is circulated through the passages 270 in these metal plates 285 to heat them to a temperature in the above range for the opposed pairs of rolls 266. The surfaces of the dielectric layers 287 in contact with the travelling web W-1 are smooth and are rounded away from the web on their leading edges as shown at 288.

The cable 126 feeds R.F. energy to the metal cores 268 of the upper rolls 266 and to the metal cores 285 of the upper plate elements 283. The metal cores of the lower rolls and lower plate elements are electrically grounded by leads 290 and the shielding housing 262 is also grounded at 292 in both FIGS. 10 and 11. An intense R.F. energy field passes through the cellulose fiber containing web W-1.

By the combined effects of the hot press reactor rolls 266 and the reactor plate elements 283, plus the R.F. energy, a rapid dielectric and thermal fusion of the cellulosic constituents in the web W-1 is accomplished. The cellulosic material in the web is fused together at temperatures in the range from 450° F to 800° F in the reactor station 6A to produce a strong fused paper or cardboard web product W-2.

The product passes through the tunnel 260 into the housing 278 of the cooling station 258. A plurality of cold rolls 280 engaging the top and bottom surfaces of the travelling product cool it down below 400° F before the product W-2 issues through the exit tunnel 282.

If desired to isolate the interior of the press reactor station 6A or 6B from the cooling station 258, a plurality of flexible sealing curtains 294 may be included in the interconnecting tunnel 260. Thus, the steam and gases from the reaction in the continuous motion press reactor station 6A or 6B are prevented from entering the cooling station.

The cooling rolls 280 may contain passages (not shown) for circulating cold water therethrough. Although the cooling station 258 is shown in a horizontal position, it is to be understood that it may be vertically positioned or constructed with horizontal and vertical sections through which the travelling web is led to conserve floor space. Similarly, the continuous motion press reactor stations 6A and 6B may be vertically positioned or constructed with horizontal and vertical sections to conserve floor space.

The housings 262 and 278 for the continuous motion press reactor stations 6A, 6B and 258 are constructed with joints at 296 extending around the perimeter of removable covers 298 which can be removed to provide access to the interiors of these housings.

In both of the continuous motion press reactor stations 6A and 6B, the travelling web is exposed on one or both of its faces from time to time to permit the escape of steam and gases of reaction from the exposed face or faces of the web as the steam and gases are being generated during the fusing of the cellulose fibers together at a reaction temperature in the range from 450° F to 800° F. A state of plasticizing of the cellulose and irreversible fusion of the cellulose fiber is reached while oxygen is excluded from the material during the time this material is above its carbonizing temperature.

It is to be understood that where the web W-1 is a relatively thin section and the internal fiber temperature does not tend to lag appreciably behind the temperature of the web surfaces, the use of the R.F. heating elements may be omitted. In this instance of thin sections, the entire heat energy may be adequately provided by the hot rolls 266 and/or plate elements 283 in the continuous motion press reactor stations 6A and 6B.

It has been described that the web W-1 passing through the press reactor stations 6A or 6B may be self-supporting. Alternatively, for any reason or where the web is not self-supporting, it may be transferred to another web carrier such as a woven wire belt or a micro-perforated sheet or felt for purposes of transporting the web while simultaneously providing for the escape of steam and gases of reaction therefrom. Such web carrier means may be provided to engage and support either one or both sides of the web W-1 in the continuous motion press reactor station 6A or 6B, and further may advantageously serve simultaneously to emboss a configuration on one or both surfaces of the cellulose web W-1, if desired.

Thus, under continuous fiber fushion, the means for providing a fused cellulosic product include means for heating the cellulose-containing web to a temperature in the range from 450° F. to 800° F. throughout its mass while controlling the application of such heat during the fusion of the cellulose and means providing for escape of steam and gases of reaction and thereafter means for cooling the hot fused cellulosic material under oxygen-excluding conditions to permit the hot reacted fiber to cool before coming in contact with the free air.

In FIG. 9, I have illustrated a dry fiber felting station 2A for forming a web sheet or mat; however, any commercially available wet fiber forming apparatus may be used. Since I prefer the dry forming apparatus, I have herein disclosed an advantageous dry method for making paper, non-woven textiles, cardboards, paperboards, fiberboards, wallboards, or the like, products, W-2, through reaction bonding of fused cellulose fibers, thus introducing a revolutionary new process for making the products listed above.

I claim:

1. The process of producing a board product from cellulose-containing fiber material by fusion bonding together of the cellulose constituents of the fibers themselves, comprising the steps of:
    (a) forming a mat from cellulose-containing fiber material in which the fibers have an interlaced fiber formation,
    (b) heating opposed press platens to a temperature in the range from 450° F. to 800° F., said temperature being above the normal temperature at which said fiber material carbonizes when exposed to the air,
    (c) introducing said mat into the region between said opposed press platens while the cellulose-containing fiber material in said mat has a equilibrium moisture content in the range from 2% to 50%,
    (d) providing a perforated heat-conducting sheet having multiple perforations and positioned intermediate one side of said mat and at least one of said heated press platens, the perforations extending completely through said sheet and being less than three thirty-seconds of an inch in diameter and the sum total area of the perforations preferably being at least 20% of the area of the side of the sheet which is adjacent to said mat,
    (e) moving said heated press platens toward each other for heating said mat by conduction of heat from said heated platens and for pressing said mat,
    (f) allowing the release of heat-generated steam and gases from said mat through said perforated sheet thereby avoiding destructive pressure build-up within the mat thereby preserving the integrity of said interlaced fiber formation in said mat, allowing air from the interstices of said mat to escape through said perforated sheet together with said steam and gases,
    (g) shielding said press platens for excluding the direct access of air to said mat while said mat is being heated and pressed intermediate said heated press platens,
    (h) applying R.F. energy to said mat for less than 120 seconds for dielectric heating of said mat in addition to the heat conducted from said heated press platens for raising the temperature throughout said mat to a temperature above the normal carbonizing temperature of said cellulose-containing fiber material and in the range from 450° F. to 800° F. for fusion bonding together the cellulose-containing fibers themselves in the mat under heat and pressure,
    (i) relieving pressure from the heated and pressed mat by opening the press platens and removing said mat therefrom, (j) thereafter cooling the heated and pressed mat down to a temperature below 400° F. while enclosing it for excluding the direct access of air thereto for producing a durable board product which is held together by said fusion bonding together of the cellulose-containing fibers themselves, and (k) cooling the durable board product to ambient temperature.

2. The process of producing a board product from cellulose-containing fiber material, as claimed in claim 1, in which:

(l) a commercially smooth two sided board product is produced without requiring sanding by providing said perforated sheet with multiple minute perforations for avoiding clogging of cellulose-containing fibers therein andfor allowing only minute fiber protrusions to be left on the surface of the board product which was in contact with said perforated sheet; and (m) passing the board product between a pair of opposed smoothing rolls pressing against opposite sides of the board product to compress and smooth the minute fiber protrusions left on said surface thereof to produce a commercially smooth two sided board product.

3. The process of producing a board product from cellulose-containing fiber material, as claimed in claim 1, in which:

(l) the heated and pressed board product is enclosed for excluding the direct access of air thereto during the cooling step (j) by the further steps of:

(m) providing a plurality of movable, flat plates of material having good heat conductivity, (n) transferring the heated between pressed board product from the vicinity of said hot press platens into a position between said plates, and (o) holding the board product betwen said plates with said plates firmly in contact with the opposite surfaces of said board product for excluding air therefrom for a period for furthering the fusion bonding together of the cellulose-containing fibers themselves while said cooling occurs.

4. The process of producing a board product from cellulose-containing fiber material, as claimed in claim 3, in which:

(p) the period of holding said board product between said plates is longer than the length of time that said mat was pressed between heated press platens.

5. The process of producing a fused cellulosic wood fiber unitary board product from cellulosic wood fiber material comprising the steps of:

(a) heating a pair of opposed hot elements having a space therebetween to a temperature in the range from 450° F to 800° F;

(b) providing cellulosic wood fiber material having an equilibrium moisture content in the range from 3% to 12%;

(c) forming said cellulosic wood fiber material into a mat wherein the fibers are mechanically mixed and interlaced together in the absence of a bonding agent, said mat having surfaces on its opposite sides and having air within itself;

(d) introducing said mat into said space between said hot elements;

(e) providing a thin porous sheet of metal intermediate at least one such surface of the mat and one of said hot elements, said porous sheet having multiple openings extending completely through the sheet, and the porosity of said thin porous metal sheet occupying at least 20% of the face area of the sheet which is facing said surface of the mat;

(f) moving said hot elements towards each other for applying pressure to said mat and for pressing said thin porous metal sheet against the adjacent surface of the mat for transferring heat energy by conduction from both of said hot elements into both surfaces of the mat, the heat energy from said one hot element being transferred by conduction through said thin porous metal sheet into said surface of the mat adjacent thereto, said pressure thereby compressing said mat to increase its density and said heating of the mat generating steam and gases of volatiles within said mat while it is under pressure;

(g) conducting away from between said thin porous metal sheet and said one hot element the steam and gases which were generated within the mat while under pressure and which hve passed through said porous metal sheet together with entrained air which has been expelled from said mat by the pressure and heat being applied thereto and by the steam being generated therein;

(h) removing said steam, gases and expelled air;

(i) increasing said applied pressure for further increasing the density of said mat and for further expelling steam, gases of volatiles and air from said mat through said thin porous metal sheet, while said increased applied pressure of the hot elements and the thin porous metal sheet and the continuing expulsion of steam and gases through said porous metal sheet prevent ambient air from coming into contact with the surface of the mat;

(j) applying R.F. energy to heat the mat by dielectric heating while it is held under such increased pressure, thereby to heat the entire mat by said dielectric heating combined with the conduction of heat from said hot elements to an elevated temperature in the range from 450° F to 800° F for permanent fusion of the cellulosic wood fiber material itself which has become fused in the absence of a bonding agent in such elevated temperature range;

(k) after the heated mat has been at said elevated temperature for less than 120 seconds, moving said hot elements apart for relieving the pressure on the heated mat;

(l) immediately transferring the heated mat from the vicinity of said hot elements to a hot stacking zone;

(m) immediately covering both surfaces of the heated mat in the hot stacking zone for excluding ambient air from the surfaces of the heated mat;

(n) reducing the temperature of the heated mat in said zone while continuing to exclude the ambient air from the surfaces thereof until the entire heated mat is below 400° F, and (o) thereafter removing the resultant unitary board product from said zone.

6. The process of producing a fused cellulosic wood fiber unitary board product, as claimed in claim 5, in which:

said step of applying R.F. energy is commenced after the steam which has been conducted away from between said thin porous metal sheet and said one hot element has become visible condensate.

7. The process for producing a commercially smooth two sides cellulosic board product without the need for sanding the product comprising the steps of:

(a) forming cellulosic fibers together in intermixed and interlaced relationship to provide a fiber mat formation;

(b) said fiber mat formation having two sides and having an equilibrium moisture content in the range from 3% to 12%;

(c) placing a thin porous metal sheet against at least one side of said mat;

(d) said thin porous sheet having minute openings therein communicating completely through said porous sheet and occupying at least 20% of the face area of the sheet which is against said one side of the mat, said openings having a diameter less than three thirty-seconds of an inch;

(e) applying heat and pressure to said mat with such a thin porous sheet pressing against at least one side of the mat, thereby compressing said mat for increasing its density and generating steam and gases within said mat;

(f) providing passageways adjacent the opposite side of said thin porous sheet from that which is pressing against the mat for allowing the release and expulsion through said sheet of such steam and gases from within the densifying mat while heat and pressure are being continuously applied to the mat;

(g) continuing the application of heat and increasing the applied pressure to compress and bond the fibers in the mat together to make a unitary board having minute protrusions of fiber on at least one side caused by the minute openings in said sheet;

(h) removing the unitary board from the heat and pressure; and (i) passing the unitary board between a pair of smooth rolls pressing against opposite sides of the board for compressing and smoothing such minute protrusions for making a commercially smooth two sides cellulosic unitary board product.

8. The dry method for making paper comprising the steps of:
(a) continuously fluffing and agitating cellulosic fibers together having a moisture content in the range from 3% to 12%

(b) distributing the fluffed and agitated fibers on a continuously moving porous lower belt in intermixed and interlaced relationship forming a web of felted fibers being carried along by said lower belt supported by a plurality of back-up rollers;

(c) progressively squeezing said felted web for compacting and consolidating the interlaced fibers by passing said lower belt beneath an upper belt converging with the lower belt and pressed toward the lower belt by a plurality of back-up rollers;

(d) moving the resulting consolidated felted web off from the lower belt and leading it through a tunnel into an electrically conductive housing enclosing a continuous motion press reactor chamber;

(e) feeding an inert gas into said enclosed chamber for excluding air therefrom;

(f) in said chamber pressing and heating said consolidated felted web to an elevated temperature in the range from 450° F to 800° F with an exposure time at said elevated temperature of less than 120 seconds for fusing the cellulosic fibers together to form a paper web, said pressing and heating of the consolidated felted web being accomplished by passing the moving web between a plurality of pairs of press rolls heated to said temperature and by applying R.F. energy to the moving web;

(g) passing the moving heated web into a second housing enclosing a cooling chamber;

(h) feeding inert gas into said cooling chamber for excluding air therefrom;

(i) in said cooling chamber cooling the paper web to a temperature below 400° F; and (j) feeding the paper web out of said cooling chamber.

9. A process for producing a permanently fused cellulose fiberboard from cellulose-containing fiber material in which the cellulose-containing fibers themselves are fusion bonded together, said process comprising the steps of:
(a) heating opposed spaced hot press platens to a temperature above the normal cellulose carbonizing and cellulose combustibility temperature of about 400° F, namely, heating said hot platens up to a temperature in the range from 450° F to 800° F;

(b) positioning a mat of the cellulose-containing fiber material having an equilibrium moisture content in the range from 2% to 50% in the space intermediate said hot press platens;

(c) providing at least one thin, microperforated sheet having a multiple of minute openings therethrough, said openings being less than three thirty-seconds of an inch in diameter;

(d) said thin microperforated sheet being capable of conducting heat and being positioned intermediate one side of said mat of fiber material and one of said hot press platens;

(e) moving said hot press platens toward each other for heating said mat by heat transfer from said hot press platens and for initially compressing said mat of fiber material, thereby generating steam and gases within said mat while it is under presure;

(f) the heat energy from said one hot press platen being transferred through said microperforated sheet into the fiber material of said mat; e (g) allowing the release through said microperforated sheet of the steam and gases generated in the compressed mat, said steam and gases passing through said sheet together with air being expelled from said mat by the heat and pressure being applied thereto;

(h) the presence of said hot press platens continuously pressing said mat and the steam and gases passing through said sheet serving to exclude ambient air from the fiber material of said mat;

(i) increasing the pressure of said hot press platens for further compressing and further heating the cellulose-containing fiber material of the compressed mat to a temperature in the range from 450° F to 800° F within a time period of up to 60 seconds for each quarter inch of thickness of the compressed mat;

(j) moving said hot press platens apart immediately after said time period for relieving the pressure on the heated compressed mat;

(k) immediately moving the heated compressed mat away from said hot press platens and into a hot stacking zone;

(l) immediately covering both sides of the heated compressed mat in the hot stacking zone for excluding ambient air therefrom;

(m) cooling the mat in said zone to a temperature below 400° F while continuing the covering of both sides thereof for producing permanent fushio bonding together of the cellulose-containing fibers themselves to make a unitary board; and (n) removing the unitary board from said zone and exposing it to ambient air after its temperature is below 400° F.

10. The process for producing a permanently fused cellulose board, as claimed in claim 9, in which: said unitary board is a board capable of passing the six-cycle accelerated aging test portion of the quality requirements for products acceptable for exterior use by the U.S. FHA.

11. The process of producing fused cellulose-containing unitary board comprising the steps of:

(a) heating opposed press elements to a temperature in the range from 450° F to 800° F;

(b) introducing cellulose-containing material having an equilibrium moisture content in the range from 2% to 50% into the region between said heated press elements;

(c) providing a heat-conductive porous sheet having a plurality of minute openings extending through the sheet from one side to the other thereof, said openings having a size less than three thirty-seconds of an inch in diameter, said sheet being positioned between one of said heated press elements and said cellulose-containing material;

(d) moving said heated press elements towards each other for applying heat and pressure to the cellulose-containing mateial with said porous sheet pressing against the material for conducting away from the material steam and gases generated in said material by the heat being transferred thereto, said steam and gases passing through said porous sheet, and allowing air from the interstices of said material to pass through said porous sheet with said steam and gases;

(e) said steam and gases which are passing through said porous sheet and said press elements serving to exclude ambient air from said material;

(f) heat from said heated press element being conducted through said porous sheet into said material;

(g) removing the steam and gases and air which have passed through the porous sheet;

(h) waiting during an initial time period while the heat and pressure are being applied to the material before R.F. energy is applied, said initial period being sufficiently long that visible steam condensate appears before the end of said initial period;

(i) after said initial period has ended and while still applying het and pressure to said material, applying R.F. energy to said material at a rate sufficient to raise the temperature in the interior of the said material located midway between said heated press elements to a temperature level above the normal carbonizing and combustibity temperature of said cellulose-containing material, said temperature level being within the range from 450° F to 800° F, said temperature level occurring within the time period commencing when the R.F. energy is applied and continuing for up to 60 seconds for each quarter inch of thickness in the final product;

(j) increasing the pressure applied to said material while R.F. energy is applied thereto for less than 120 seconds for consolidating said material into a unitary board product in which cellulose-containing material has become fused together;

(k) moving said heated press elements away from each other for relieving the pressure applied to said board;

(l) removing the unitary board product from the vicinity of said heated press elements;

(m) cooling said unitary board while enclosing said board for excluding ambient air therefrom until the temperature throughout said board is 400° F, and (n) thereafter exposing said board to ambient air.

12. The process of producing a unitary boad product having fused cellulose-containing material therein, as claimed in claim 11 in which:

(o) the application of the R.F. energy is discontinued while said heated press elements continue to apply heat and pressure to said material; and (p) continuing to apply heat and pressure by said heated press elements for a significant period after the application of R.F. energy has been discontinued for providing surface hardness to the board product.

13. The dry method of producing paper by fusing cellulose-containing fiber material comprising the steps of:

(a) forming a continuous web from cellulose-containing fiber material in which the fibers have an interlaced fiber formation;

(b) heating opposed press rolls to a temperature in the range from 450° F to 800° F, said temperature being above the normal temperature at which said fiber material carbonizes when exposed to the air;

(c) advancing said web into a region between said opposed hot press rolls while the cellulose-containing fiber material in said mat has an equilibrium moisture content in the range from 3% to 12% for compressing and heating the fiber material in said web to a temperature in the range from 450° F to 800° F;

(d) feeding inert gas into a housing enclosing said hot press rolls for excluding air from the vicinity thereof and from the fiber material of the web being compressed and heated;

(e) after the fiber material of the web has become compressed and has become heated throughout to a temperature in said range and has been at said temperature for less than the time period for producing carbonizing thereof, advancing the compressed, heated web into a cooling station:

(f) feeding inert gas into another housing enclosing said cooling station for excluding air from said cooling station;

(g) cooling the compressed web to a temperature below 400° F in said cooling station; and (h) advancing from said cooling station a resulting web of paper having fused cellulose-containing fiber material therein.

14. A paper having fused cellulose-containing fiber material therein produced by the process of claim 13.

* * * * *